(12) United States Patent
Swick

(10) Patent No.: US 9,083,796 B2
(45) Date of Patent: *Jul. 14, 2015

(54) TECHNIQUE FOR ASSISTING A USER WITH INFORMATION AND CUSTOMER SERVICES AT A CALL CENTER

(75) Inventor: Corvin F. Swick, White Salmon, WA (US)

(73) Assignee: Grape Technology Group, Inc., Bethlehem, PA (US)

( * ) Notice: Subject to any disclaimer, the term of this patent is extended or adjusted under 35 U.S.C. 154(b) by 2391 days.

This patent is subject to a terminal disclaimer.

(21) Appl. No.: 10/449,963

(22) Filed: May 30, 2003

(65) Prior Publication Data

US 2004/0240655 A1 Dec. 2, 2004

(51) Int. Cl.
| | |
|---|---|
| H04M 3/42 | (2006.01) |
| H04M 7/00 | (2006.01) |
| H04M 3/493 | (2006.01) |
| H04M 3/51 | (2006.01) |

(52) U.S. Cl.
CPC .............. *H04M 3/4931* (2013.01); *H04M 3/51* (2013.01); *H04M 3/4935* (2013.01)

(58) Field of Classification Search
CPC ............ H04M 3/4931; H04M 3/4933; H04M 3/42068; H04M 3/436; H04M 3/42
USPC ......................................... 379/201.01, 218.01
See application file for complete search history.

(56) References Cited

U.S. PATENT DOCUMENTS

| | | | | |
|---|---|---|---|---|
| 5,943,410 | A * | 8/1999 | Shaffer et al. ............ | 379/213.01 |
| 6,870,915 | B2 * | 3/2005 | Stillman et al. .......... | 379/201.01 |
| 6,970,548 | B2 * | 11/2005 | Pines et al. ............... | 379/218.01 |
| 7,020,261 | B2 * | 3/2006 | McGrath et al. ......... | 379/218.01 |
| 2004/0161097 | A1 * | 8/2004 | Henry ...................... | 379/266.02 |

* cited by examiner

*Primary Examiner* — Rasha Al Aubaidi
(74) *Attorney, Agent, or Firm* — Sofer & Haroun, LLP

(57) ABSTRACT

A caller seeks customer service related to the provision of information assistance service whose call is transferred from an information assistance service center to a customer service center. After the customer service center assists the caller with the customer service question, if the caller needs information assistance, the customer service center provides the necessary assistance, without transferring the call back to the information assistance service center. The customer service center may also be able to help connect the caller to the desired destination number. The connection to the destination number, however, is routed through the information assistance service center, not the customer service center, based on data transmitted from the customer service center to the information assistance service center.

18 Claims, 3 Drawing Sheets

TECHNIQUE FOR ASSISTING A USER WITH INFORMATION AND CUSTOMER SERVICES AT A CALL CENTER

BACKGROUND OF THE INVENTION

The invention relates generally to an information assistance system and method. More specifically, the invention relates to a system and method for providing an information assistance service by a call center.

In a typical directory assistance call, a caller identifies to the operator the name and address (sometimes city or area code) of a party whose telephone number is desired. In response, the operator locates the desired destination telephone number using, e.g., a computer database. The destination number is then provided to the caller, e.g., by a computerized voice server which provides automated voicing of the number, and the caller is afforded an option to be connected to the destination number without the need of first terminating the directory assistance call.

Information assistance is an extension of directory assistance. In addition to connecting a caller to a destination number, information assistance operators can provide concierge-type services such as a restaurant guide and reservation service, event ticketing and reservation service, hotel reservation and availability service, travel or flight reservation and ticketing services, ordering specific items such as flowers or food delivery, arranging transportation, and accessing entertainment guides. The use of information assistance to provide such concierge-type services is disclosed, e.g., in commonly-assigned, co-pending U.S. application Ser. No. 09/520,306, "Technique for Providing Information Assistance Including Concierge-Type Services," filed Mar. 7, 2000, incorporated herein by reference.

In addition, if a caller subscribes to an information assistance service, the caller may have one or more user profiles on file with the service that includes information pertaining to and about the caller, including his/her preferences. Such information may include a list of contacts (i.e., a personal phone directory), a schedule of appointments, to-do lists, notes, and personal preferences about such topics as restaurants, movies, sporting events, or hobbies. The caller may access the information assistance service in order to connect to a contact, retrieve an appointment or to-do list item, set up a new appointment or to-do list item, or request information about a restaurant, movie, or sporting event falling within the caller's personal preferences. The information assistance service may connect the caller to the contact or restaurant, or may make reservations at the restaurant or movie or sporting event as desired by the caller. The use of information assistance to provide these types of information management services is disclosed, e.g., in U.S. Pub. No. 2002/0055351 A1, published May 9, 2002, incorporated herein by reference.

Often, a caller has a question regarding his or her information assistance services bill or a related question, which should be directed to customer service rather than to information assistance. For callers' convenience, the information assistance service provider may have one contact number for all of its services, typically a directory-assistance-type number that is easy for customers to remember. Even if the information assistance service provider has separate numbers for information assistance and customer service, a caller may call the information assistance number for customer service anyway because of his or her frequent use of the information assistance number, which immediately comes to mind when the caller desires customer service. When the caller calls the information assistance contact number, the caller asks the information assistance operator for help with a customer service query. The information assistance operator then transfers the caller to a customer service representative (CSR).

SUMMARY OF THE INVENTION

After the CSR assists the caller with his or her customer service question, the CSR asks whether the caller needs any more assistance of any kind. If the caller does need information assistance, in the prior art the CSR would transfer the caller back to the information assistance service, handing the call off to another representative such as an operator, and the caller would request information assistance from the information assistance operator. To the caller, this process is ineffective, and requires being switched back and forth among several different operators or customer service representatives.

In accordance with the invention, rather than transfer the caller back to the information assistance service provider and another operator to provide information assistance, the CSR (or, more generically, a second service provider or call center) performs the requested additional information assistance service. Such information assistance service may include directory assistance and connecting the caller to a desired destination party. Using a data connection between the CSR and the information assistance service center, the CSR transmits connection information to the information assistance service center from which the call was initially transferred to the CSR, and the call is connected to the destination party through the information assistance service center. As a result, it is transparent to the caller that the call was switched through the information assistance service center.

Advantageously, in the case where the CSR and the destination party are not within the same LATA (local access transport area), the connection to the destination party is made through the information assistance service center, which is maintained as a local or long-distance connection with respect to the information assistance service center (and the caller would be charged accordingly), unaffected by the fact that the call was initially transferred from the information assistance service center to the remote CSR.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

The present invention is directed to providing information assistance services to a caller whose call has been transferred from an information/call center to a customer service and information/call center ("CSI call center"), providing customer service as well as information assistance services. Once the CSI call center has completed its task, the CSI call center is ready to provide an information assistance service to the caller, without transferring the caller back to the initial information/call center. Such callers (or users) may be wireline (landline) telephone, wireless telephone, and other communications device (e.g., PDA) users. Such information assistance services include providing information management tools such as private directory, direct connect, calendaring, and user profile functions (collectively, "information management services") and concierge-type services as described below. Such information management services can be flexibly defined by the users to effectively handle dynamic information. The latter may include, e.g., sales and price data that vary with time, and user profile preferences adjustable depending on different conditions, e.g., weekdays vs. weekends, daytime vs. evening, travel in business class vs. first class when one of the classes is full, and whether the user is in a roaming calling area.

An expansive network of information/call centers is used where operators can effectively provide callers with the personalized information and communications services. Such services may include, e.g., providing directory information, movie listings, restaurant recommendations, directions to various places, etc.; making reservations; sending invitations; administering appointment calendars; ticketing; and conducting other transactions for the users. The term "operator" used herein broadly encompasses entities that are capable of providing information assistance in a telecommunications environment, including, without limitation, human operators, voice response/recognition capabilities, web-/WAP-enabled operator services, and other automated and electronic access.

Figure 1:
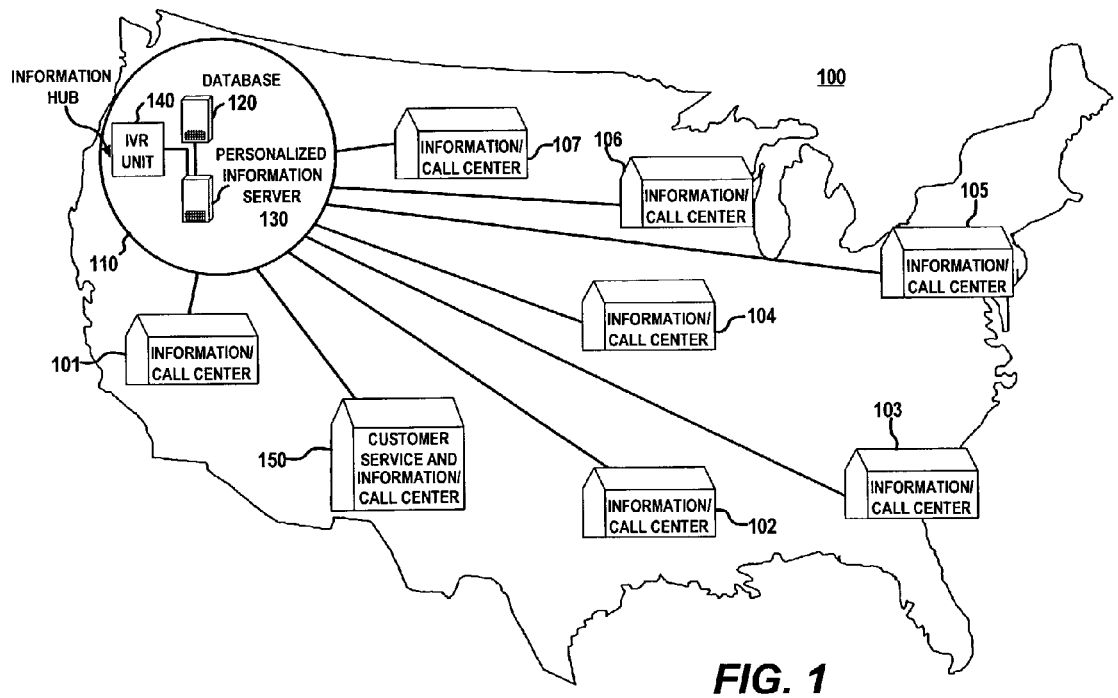
FIG. 1 illustrates a communications system including information/call centers and customer service and information/call centers in accordance with an embodiment of the present invention.

FIG. 1 illustrates a system embodying the principles of the invention, which includes wide area network (WAN) 100 covering an extensive area. WAN 100 can be an Internet-based network such as the World Wide Web or a private, intranet-based network. In this illustrative embodiment, WAN 100 connects operators dispersed throughout a wide coverage area in information/call centers 101-107. Each of information/call centers 101-107 covers one or more regional coverage areas. One or more information hubs 110 are also included in WAN 100. An information hub 110 includes one or more personalized information servers 130 which are accessible by the operators in the system and one or more databases 120 in which users' contacts, appointments, and other folders and information are stored and maintained. Information hub 110 may also include interactive voice response (IVR) unit 140 connected to server 130 for interacting with the user by voice, e.g., announcing to the user selected appointments. In addition to storing folders and information in information hub 110, they may also be stored locally at one or more of the information/call centers. The folders and information at different centers are synchronized. Synchronized databases provide necessary backup as well as support to roaming mobile device users.

Other details regarding the contacts, appointments, and other folders and information stored in information hub 110 can be found in above-referenced U.S. Pub. No. 2002/0055351 A1. In particular, a contacts folder contains contact information, such as telephone, address, and e-mail, for people and/or organizations. A user may have separate contacts folders for different purposes, such as a personal contacts folder, a business contacts folder, a sports team contacts folder, etc. An appointment folder typically contains a user's appointment and/or calendar information, and may also have different appointments folders for different purposes. Other folders may include to-do lists, notes, e-mail, events, products, and other information that may be tailored to the needs of an individual or a group, e.g., a corporation, an organization, or a collection of people having a common interest. These folders are stored in database 120 and are accessible by each information assistance operator through server 130. The user may have specific rights with respect to a folder, e.g., owner, administrator, read-only, etc. When the user accesses a folder through the operator, the operator becomes an alter ego of the user and is subject to the same rights as the user with respect to the folder. The user may create, maintain, or access a contacts, appointments, or other folder via the Internet or other communications means, or through an operator who in turn may create, maintain, or access the folder on behalf of the user.

In addition to providing information assistance, an information assistance service provider may perform or provide other, ancillary functions, such as billing, customer service, and advertising. Illustratively, a center for performing such ancillary functions may be referred to as a "CSI/Call Center," denoted 150 in FIG. 1. CSI/call center 150 may be a part of WAN 100 (as shown in FIG. 1) and may also have access to information hub 110, in a manner similar to information/call centers 101-107. Although not shown in FIG. 1, there may be more than one CSI/call center 150. Moreover, CSI/call center 150 may be remote from information/call centers 101-107; however, it may also be co-located with any of the information/call centers. For example, while it may be advantageous for information/call centers 101-107 to be located in regions having many customers, CSI/call centers may be located in regions closer to the information service provider's corporate headquarters or in locations in which administrative services are performed. In this illustrative embodiment of the present invention, CSI/call center 150 not only has the same capabilities of the information/call centers to look up directory information and provide information management and concierge-type services, but also has other capabilities as described below.

In operation, the user dials a designated access number, and the call is routed to, say, information/call center 101 where an operator attends to the call. In the case in which the user desires an information assistance service, such as a directory assistance, information management, or concierge-type service, the user would make such a request to the operator and the operator would access personalized information server 130 through WAN 100 (or alternatively via the Internet). In response, server 130 would present on the operator's terminal various graphical user interface (GUI) dialog boxes, e.g., "login" (for confirming the user's identity via User ID and password), "home" (listing the user's contacts, appointments, and other folders), "edit" (for editing specific folder contents), and "view" (for viewing folder contents), for interacting with the operator.

In this illustrative embodiment of the present invention, however, the user initially desires a customer service other than information assistance. For example, the user may have a billing or other customer-service-type question. One of the advantages of the present invention is that the user only has to call one number to access the information assistance provider, whether the user desires information assistance or, in this case, customer service.

Figure 2:
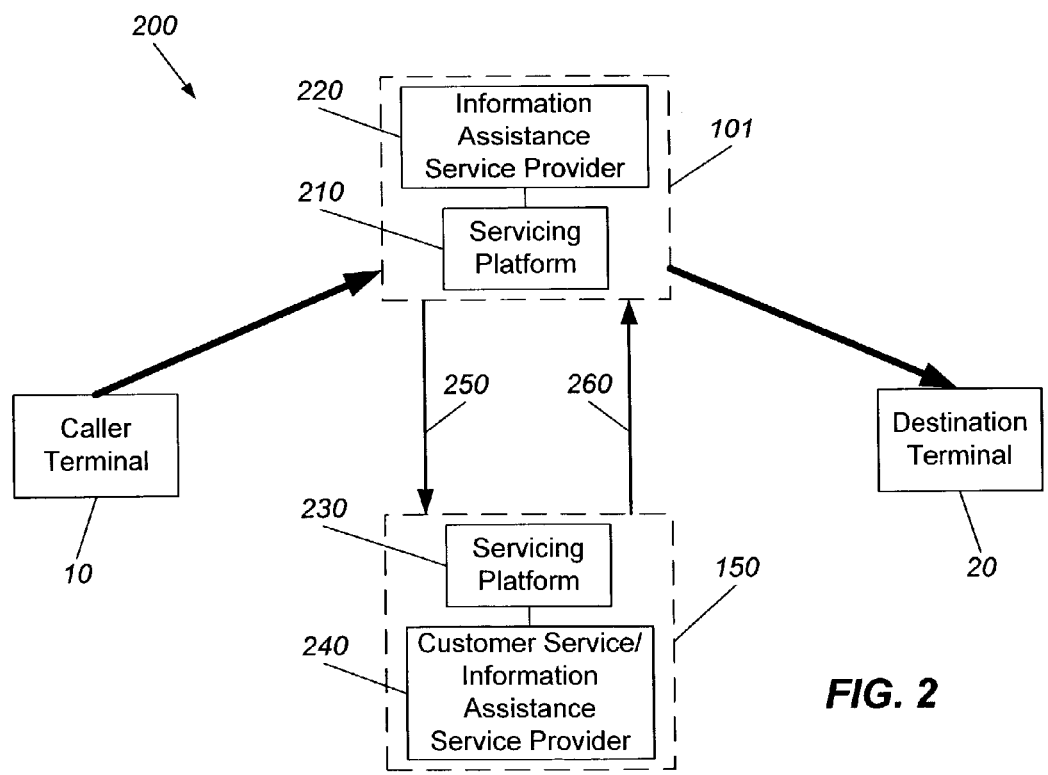
FIG. 2 illustrates a system for connecting an information assistance service call to a destination terminal in accordance with an embodiment of the present invention.

FIG. 2 illustrates arrangement 200 in which a caller initiates a customer service call (used illustratively herein) from caller terminal 10, which is routed to information/call center 101 via one or more carrier switches in a carrier network, e.g., a public switched telephone network (PSTN), a wireless telephone network, etc. Caller terminal 10 may comprise a wireless telephone, wireline telephone, personal digital assistant (PDA), computer, or other communication device. Information/call center 101 generically represents any of the aforementioned information/call centers 101-107 shown in FIG. 1. In this illustrative embodiment, users of a particular telephone carrier may dial, speak or otherwise communicate predetermined access digits, access codes or retail numbers, or input a predetermined address or URL (uniform resource locator) established by the carrier to access information/call center 101. For example, the predetermined access digits may be "411," "*555," "555-1212," "00," etc. Once connected to information/call center 101, the user requests to be transferred to customer service. Information/call center 101 transfers the call to CSI/call center 150, handling customer service, as shown by connection 250. Such a transfer may be made using WAN 100 or another private telephone line connecting the information/call centers and the CSI/call center, or the transfer may be made by connecting through the PSTN, using, for example, a toll-free (e.g., "800") number.

Once the call arrives at CSI/call center 150, a customer service representative (CSR) may be conferenced in and then the call is handed over to CSI/call center 150, keeping connection 250 intact. The caller makes one or more customer service requests to the CSR, and the CSR responds to the requests to the caller's satisfaction. The CSR asks the caller if there are any other requests. If not, the caller hangs up and connection 250 is broken down. However, if the caller has an information assistance service request, in the present invention the CSR is ready to provide such assistance. This differs from the prior art where the CSR would return the caller, back to information/call center 101, engage another operator, and disconnect the connection between information/call center 101 and CSI/call center 150, all contributing to possible annoyance and frustration on the part of the caller for being bounced around from one operator to another.

In accordance with the present invention, the CSR provides the caller with requested information, e.g., a desired destination number, information management services, or concierge-type services. If the caller elects to have the call completed to destination terminal 20 associated with the destination number (or connected to a restaurant to make a reservation), the call is routed through information/call center 101, and not CSI/call center 150, to destination terminal 20 via one or more of the public (e.g., the PSTN) and private networks, switches, trunks, and central and end offices. This is done without engaging another operator in information/call center 101.

Figure 3:
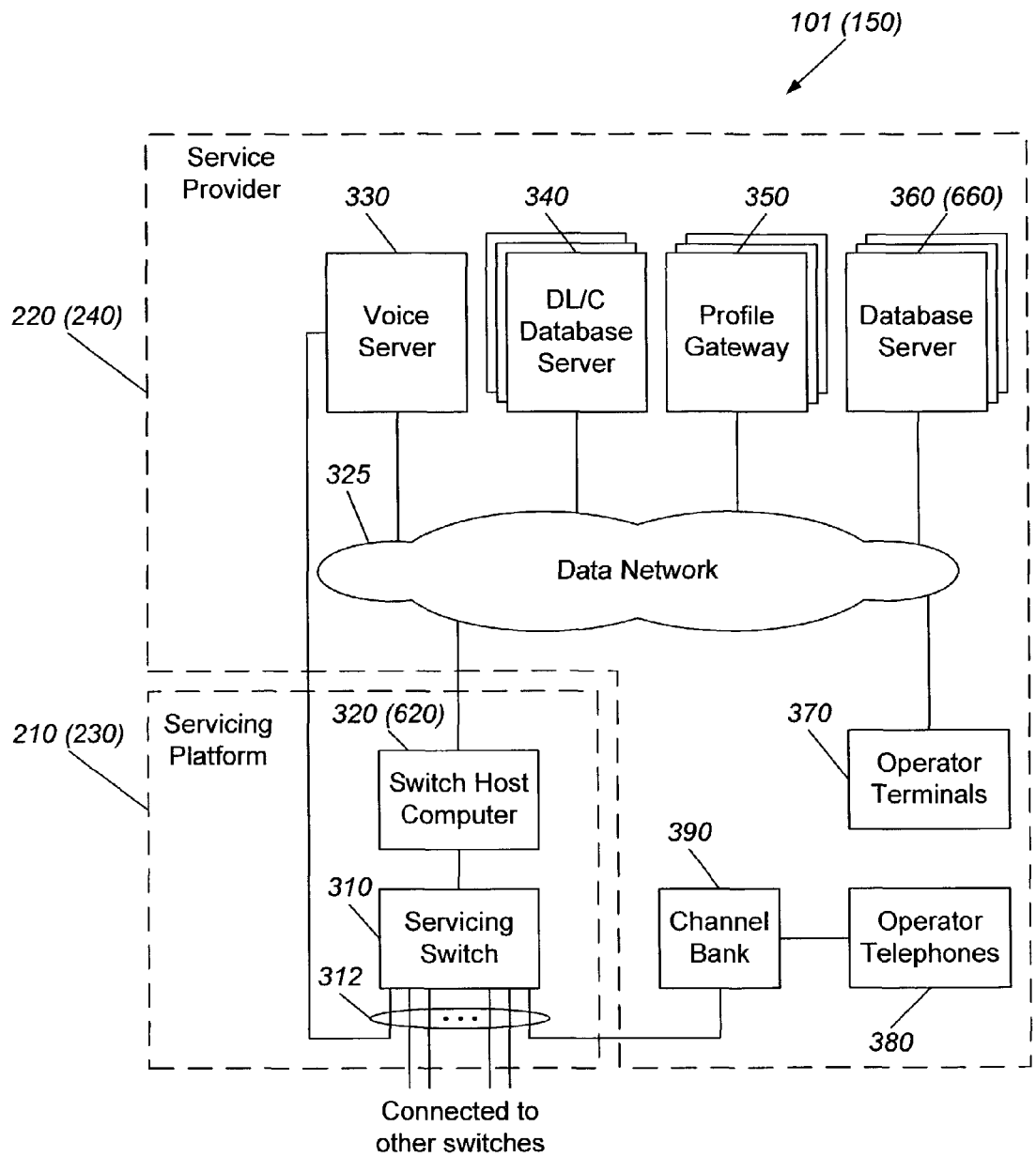
FIG. 3 illustrates an information assistance service provider and a servicing platform for providing an information assistance service.

FIG. 3 illustrates information/call center 101 and CSI/call center 150. Information/call center 101 may be configured to include information assistance service provider 220 together with servicing platform 210. It should be noted that even though both provider 220 and servicing platform 210 appear in the same figure, they may or may not be located in the same geographic area. CSI/call center 150 may be configured to include, customer service/information assistance service provider 240 together with servicing platform 230. These elements are arranged in a manner analogous to that of information assistance service provider 220 and servicing platform 210, respectively, and operate in the same manner except for differences described below (and indicated by reference numerals in parentheses). Servicing platform 210 includes servicing switch 310 having T1 spans 312 for connection to voice server 330, channel bank 390, and one or more carrier networks. In an alternate embodiment, voice information may be packetized and transmitted pursuant to a VoIP (voice over IP (Internet Protocol)) protocol over a packet-switched network, e.g., the Internet, to information/call center 101. Servicing switch 310 may receive an incoming information assistance call from a carrier switch in a carrier network. Servicing switch 310 may also be used to place an outgoing call onto a carrier network, which may be different from the carrier network used for the incoming call.

Channel bank 390 in provider 220 is used to couple multiple operator telephones 380 to servicing switch 310. The operators in information/call center 101 (and CSRs in CSI/call center 150) are further equipped with operator terminals 370, each of which includes a video display unit and a keyboard with an associated dialing pad. Operator terminals 370 are connected over data network 325 to one or more database servers 360, switch host computer 320, voice server 330, personalized information servers 130, etc. By way of example, data network 325 includes a local area network (LAN) supplemented by a number of point-to-point data links. Through data network 325 and routers (not shown), components of information/call center 101 may also be connected to the Internet or other wide area networks (WANs).

Servicing switch 310 is conventional and supports digital T1 connectivity. The operation of servicing switch 310 is governed by instructions stored in switch host computer 320. In this illustrative embodiment, servicing switch 310 includes, among other things, arrays of digital signal processors (DSPs). These DSPs can be programmed and reprogrammed to function as, among other things, call progress analyzers (CPAs), call progress generators (CPGs), multi-frequency (MF) tone generators/detectors, voice recognizers, dual-tone multi-frequency (DTMF) generators/detectors, or conference units, depending on the demand placed on information/call center 101 and servicing switch 310 for each corresponding function.

An incoming call requesting assistance is received by servicing switch 310 in information/call center 101, which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 320 or elsewhere in information/call center 101. In other instances, other distribution logic schemes may be utilized, such as skills-based routing or a priority scheme for preferred users. In a preferred embodiment, when the information assistance call is received by servicing switch 310 in information/call center 101, switch 310 derives, in a well-known manner, from the signaling associated with the call the caller's phone number from which the call originates, known as an ANI (automatic number identification).

In the embodiment of the present invention, the caller requests customer service. The information assistance operator proceeds to transfer the call to CSI/call center 150. In addition, in order to keep track of the call in the event the call is to be connected to destination terminal 20, switch host computer 320 records the ANI of the incoming call, assigns a CSN (call sequence number) to the call, and associates that number with the port (or T1 span) on which the call arrived at information/call center 101. Then, this operator calls CSI/call center 150, preferably using a toll-free ("800") number over the public telephone network. Alternatively, the call can be made over a private network operated by the information assistance service provider. In either case, the telephone number used to reach CSI/call center 150 is unique to information/call center 101 (e.g., there are seven 800 numbers for seven information/call centers 101-107 reaching call center 150, respectively), allowing CSI/call center 150 to trace from which information/call center the call originates. This tracing can be performed using DNIS (direct number identification service) or DID (direct inward dial) service. As fully described below, this information will be used to send connection information back to the correct call center 101. In addition, in order for CSI/call center 150 to keep track of the call, switch host computer 320 takes the caller's ANI and inserts it into the signaling associated with the call from call center 101 to call center 150, in place of call center 101's ANI.

When the call reaches CSI/call center 150, the caller is connected to a CSR in a conference-call type setup, and the information assistance operator drops off of the line, but connection 250 between information/call center 101 and CSI/call center 150 remains. The CSR responds to the caller's customer service questions, including performing searches on database server 660, which provides access to both information assistance databases and customer service databases, such as billing information. When all of the customer service questions have been resolved, the CSR asks if the caller needs any more assistance. If not, the caller hangs up, and connection 250 between information/call center 101 and CSI/call center 150 is broken down. However, if the caller desires information assistance, the CSR is available to render such assistance without transferring the caller back to information/call center 101 and another operator as in the prior art.

When providing information assistance, CSRs may use database server 660 to search for a caller's desired party and determine the appropriate destination number of the party. Other information assistance concerning restaurant recommendations, movie listings, events, etc. may also be provided by searching one or more of the internal and external databases, and the Internet.

Voice server 330 is used to play the constant repeated parts of an operator's or CSR's speech, namely, the various greetings and signoffs (or closings). Voice server 330 is connected via data network 325 to switch host computer 320, 620 and via one or more T1 spans to servicing switch 310. Voice server 330 may comprise a general-purpose computer and one or more voice cards for voice recognition, voice recording and playback, and call progress analysis. At appropriate stages in a call progression, switch host computer 320, 620 initiates a voice path connection between voice server 330 and servicing switch 310 such that the caller, or the caller and the operator or CSR, are able to hear whatever pre-recorded speech is played on that connection by voice server 330. Computer 320, 620 then instructs voice server 330, via data network 325, what type of message to play, and passes data parameters that enable voice server 330 to locate the message appropriate to the call state.

Data network 325 may further connect to directory listing/concierge (DL/C) database server 340 and a profile gateway 350. DL/C database server 340 may contain directory listing information on restaurants, events, accommodations, transportation, travel information and booking, stock prices, weather, and other services such as grocery or flower delivery, etc. Together, DL/C database server 340 and database server 360, 660 provide operators and CSRs with the means to search for a caller's desired party and determine the appropriate telephone number. Preferably, these databases can search not only by name and address, but also by type of goods/services and/or geographical region, or by any other attribute in the caller record, including phone number. For example, DL/C database server 340 can answer queries soliciting the names/numbers of restaurants serving a desired cuisine on a given street.

Profile gateway 350 provides access to a user profile, which may include information about a subscriber to the information assistance service or customer service. Such information may include the subscriber's name, contact details (e.g., preferred phone number, fax number, and e-mail address), preferences (e.g., preferred restaurant and dining time, preferred mode of delivery of reservations), dietary requirements, likes and dislikes, past logged activities, etc. Switch host computer 320, 620 requests via profile gateway 350 any profile identified by the ANI previously received. One embodiment of profile gateway 350 may include a data network interface, a communications interface, a processor, and memory. Profile data may be input and updated (e.g., via Internet web pages or operator) through a profile manager. (not shown) located, e.g., in information hub 110 in FIG. 1. Copies of the profile data are distributed to the profile gateways in various information/call and CSI/call centers through. WAN 100. In response to a request for a profile, the processor in the profile gateway searches the memory (which may include disks, caches, and volatile and nonvolatile memories) for the profile identified by the ANI. If a profile is available, the profile data are served to switch host computer 320, 620 and database servers 340 and 360, 660. When the operator or CSR answers the call, server 360, 660 communicates to the operator or CSR through terminal 370 any profile data pertinent to the handling of the call. The operator or CSR then interacts with the caller and uses server 360, 660 to locate the requested listing. Once a listing is located, the relevant user preferences from the profile automatically populate the fields in an electronic request, e.g., for a restaurant reservation, on operator terminal 370, thereby reducing the need for interrogation by the operator or CSR.

Figure 4:
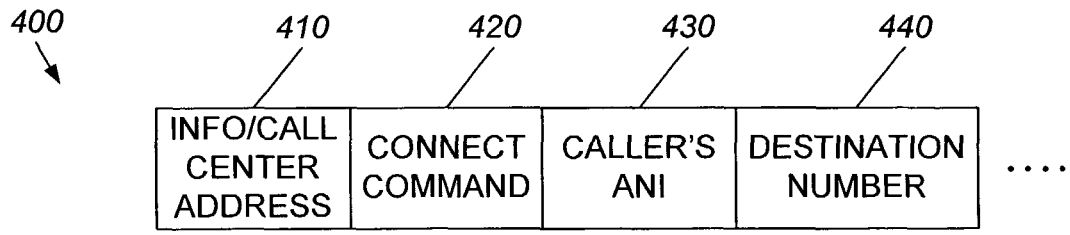
FIG. 4 illustrates a data packet transmitted to an information assistance service provider to connect a call in accordance with an embodiment of the present invention.

Once the CSR retrieves the requested information, the caller in this instance chooses to be connected to destination terminal 20 based on the connection information (e.g., destination telephone number) in the requested listing. The CSR accordingly selects a connection option on operator terminal 370, which also displays thereon the connection information, thereby releasing voice line 250. In response to the selection of the connection option, switch host computer 620 determines whether the call originated in CSI/call center 150 or had been transferred from an information/call center to CSI/call center 150 via an 800 number. In the former case, switch host computer 620 connects the call to destination terminal 20 through servicing platform 230. In the latter case, which is the case here, computer 620 assembles a data packet 400 as shown in FIG. 4. A first field of data packet 400 contains the address 410 of the information/call center to which the packet is to be sent. If data packet 400 is transmitted using, e.g., TCP/IP protocol, address 410 may be an IP address of the information/call center. This IP address may be derived using a table, stored in memory associated with computer 620, correlating the DNIS or DID of each information/call center with its IP address. A second field of data packet 400 contains connect command 420, which is the command for instructing the servicing switch in the receiving information/call center to perform a call connection. In this embodiment, connect command 420 is accompanied by at least two pieces of information—the caller's ANI 430 and the destination number 440. These two pieces of information follow connect command 420 in data packet 400. Data packet 400 may also include other fields as a person skilled in the art may see fit.

Data packet 400 is then transmitted over data connection 260, via WAN 100, from CSI/call center 150.

Based on address 410, data packet 400 is routed to information/call center 101 wherein switch host computer 320 proceeds to read it. In response to connect command 420, switch host computer 320 takes ANI 430 and matches it with its list of active connections and finds from a table the port of servicing switch 310 to which the incoming call is connected. The computer instructs switch 310 to establish a new outbound connection to destination terminal 20, using destination number 440. All of this is performed without engaging another operator in information/call center 101.

Figure 5:
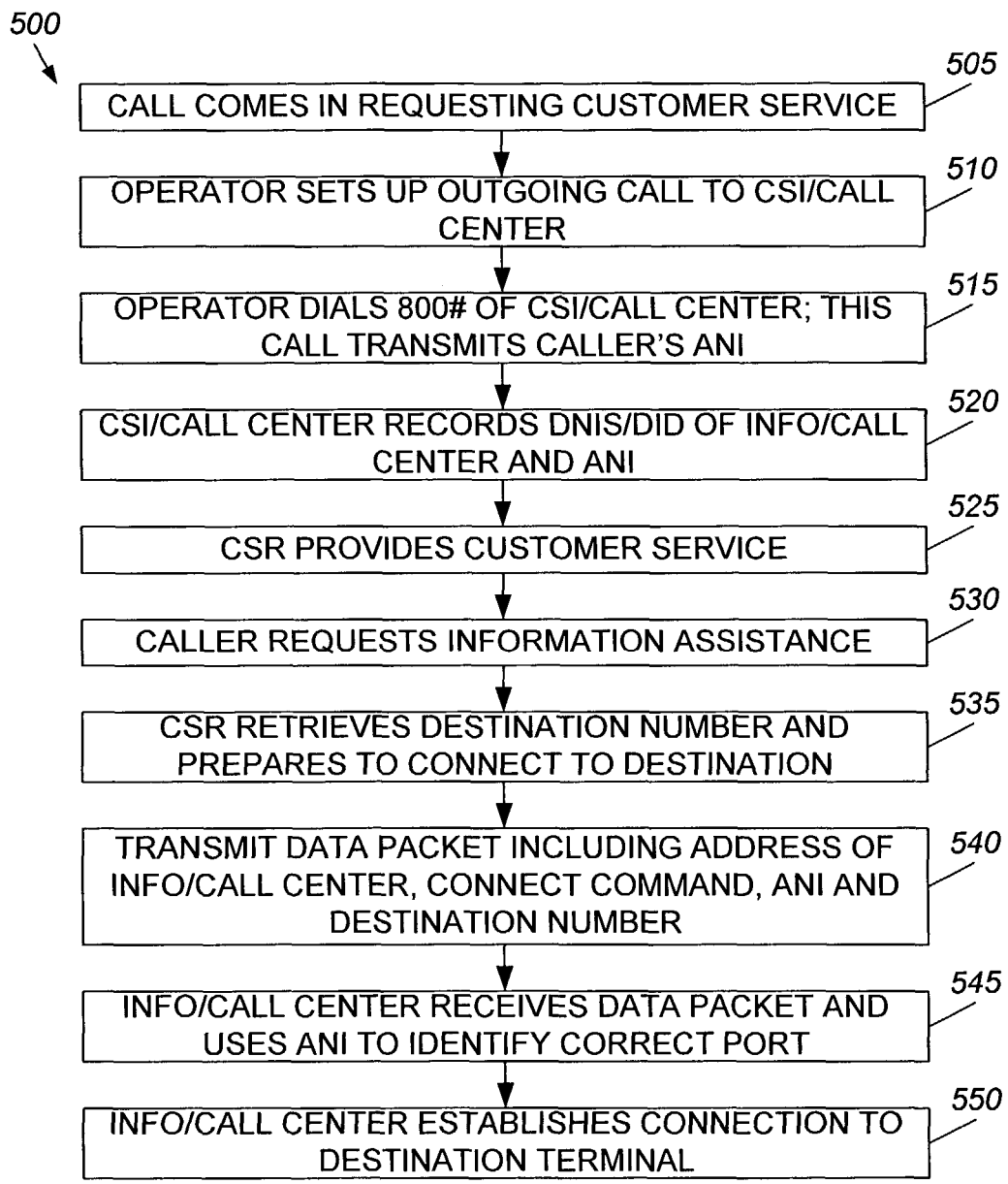
FIG. 5 is a flowchart depicting a routine for providing customer service and information assistance in accordance with an embodiment of the present invention.

FIG. 5 illustrates routine 500 for providing information assistance from a CSI/call center in accordance with an embodiment of the present invention. In step 505, a caller calls information/call center 101 and requests customer service. The information assistance operator in step 510 sets up an outgoing call to CSI/call center 150. This includes having computer 320 record the caller's ANI, the identification number of the switch port to which the call is connected, and the call sequence number. In step 515, the operator dials the 800 number of CSI/call center 150 and the call transmits the caller's ANI. Upon receiving the call in step 520, CSI/call center 150 records the DNIS or DID of information/call center 101 and the caller's ANI.

In step 525, the caller speaks with the CSR, and the CSR resolves the customer service request. In step 530, the caller requests information assistance. While providing information assistance, in step 535 the CSR retrieves the destination number and prepares to connect the caller to the destination. In step 540, computer 620 transmits a data packet, i.e., packet 400, including an address of the information/call center from which the call was transferred, a connect command, the ANI associated with the caller's call, and the desired destination number. In step 545, information/call center 101 receives the data packet and uses the ANI to identify the incoming switch port to which the call is connected. Finally, in step 550, information/call center 101 establishes a connection extending from the incoming port to destination terminal 20 to connect the caller to the destination party.

As discussed above, additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

In addition, the invention equally applies regardless of whether feature group D (FGD)-type signaling, SS7 out-of-band signaling or other signaling is used for communications between carrier switches and switch 310 of FIG. 3.

Finally, information/call center 101 and CSI/call center 150 are disclosed herein in a form in which various functions are performed by discrete functional blocks. However, any one or more of these functions could equally well be embodied in an arrangement in which the functions of any one or more of those blocks or, indeed, all of the functions thereof are realized, for example, by one or more appropriately programmed processors.

What is claimed is:

1. A method for providing an information assistance service, comprising:
    receiving a call from a caller, wherein at least at some point during said call said caller makes a first customer service request and a second information assistance request;
    receiving said call at an information assistance service provider, and transferring said call to a customer service request service provider;
    receiving at said customer service request service provider a call from said information assistance service provider;
    providing to the caller information responsive to said first customer service request;
    at said same customer service request service provider, obtaining connection information concerning a destination party responsive to said second information assistance service request; and
    transmitting data from said customer service request service provider to the information assistance service provider, the data including at least the connection information and an instruction causing the information assistance service provider to connect the call to the destination party based on the connection information.

2. The method according to claim 1, wherein the information assistance service request comprises a request for directory assistance service.

3. The method according to claim 1, further comprising searching at least one database for the connection information.

4. The method according to claim 1, wherein the information assistance service request comprises a request for a concierge-type service for providing information concerning a supplier of desired goods or services.

5. The method according to claim 4, wherein the concierge-type service includes making a reservation with the supplier.

6. A method for providing an information assistance service, comprising:
    receiving, by an information assistance service provider, a call from a caller wherein at least at some point during said call said caller makes a first request for customer service provided by a second customer service provider, and a second information assistance service request;
    connecting the call to the second customer service provider;
    providing, by the second customer service provider, to the caller information responsive to said first customer service request;
    receiving from the caller, by the second customer service provider, said second information assistance service request;
    obtaining connection information concerning a destination party responsive to said second information assistance service request; and
    transmitting data from said second customer service provider to the information assistance service provider, the data including at least the connection information and an instruction causing the information assistance service provider to connect the call to the destination party based on the connection information.

7. The method according to claim 6, further comprising determining whether a call is to be connected through the information assistance service provider.

8. The method according to claim 7, further comprising connecting the call through the information assistance service provider based upon the telephone number used to access the second service provider.

9. The method according to claim 6, wherein the information assistance service request comprises a request for directory assistance service.

10. The method according to claim 9, wherein the connection information includes a telephone number.

11. The method according to claim 6, further comprising searching at least one database for the connection information.

12. The method according to claim 6, wherein the information assistance service request comprises a request for a concierge-type service for providing information concerning a supplier of desired goods or services.

13. The method according to claim 12, wherein the concierge-type service includes making a reservation with the supplier.

14. A system for providing an information assistance service, comprising:
   an information assistance service provider; and
   a second customer service provider, wherein the information assistance service provider receives a call from a caller wherein at least at some point during said call said caller makes a first customer service request and a second information assistance request, such that said information assistance service provider connects said call to the second customer service provider said;
   the second customer service provider provides information responsive to said first service request;
   the same said second customer service provider further obtains connection information responsive to said second information assistance request from said call; and
   the second customer service provider transmits data to the information assistance service provider, the data including at least the connection information and an instruction causing the information assistance service provider to connect the call to the destination party based on the connection information.

15. The system according to claim 14, wherein the information assistance service request comprises a request for directory assistance service.

16. The system according to claim 14, further comprising searching at least one database for the connection information.

17. The system according to claim 14, wherein the information assistance service request comprises a request for a concierge-type service for providing information concerning a supplier of desired goods or services.

18. The system according to claim 14, further comprising:
   an interface for receiving the call from the caller;
   at least one database for obtaining therefrom connection information responsive to the information assistance service request;
   a mechanism for connecting the caller to the second service provider; and
   a second mechanism for connecting the call to a destination terminal based on the connection information.

* * * * *